United States Patent
Mizumura

(10) Patent No.: US 8,085,344 B2
(45) Date of Patent: Dec. 27, 2011

(54) MODULE SOCKET

(75) Inventor: Akinori Mizumura, Yokohama (JP)

(73) Assignee: Molex Incorporated, Lisle, IL (US)

( * ) Notice: Subject to any disclaimer, the term of this patent is extended or adjusted under 35 U.S.C. 154(b) by 137 days.

(21) Appl. No.: 11/992,355

(22) PCT Filed: Sep. 28, 2006

(86) PCT No.: PCT/US2006/038415
§ 371 (c)(1),
(2), (4) Date: Jul. 23, 2010

(87) PCT Pub. No.: WO2007/041484
PCT Pub. Date: Apr. 12, 2007

(65) Prior Publication Data
US 2010/0283890 A1    Nov. 11, 2010

(30) Foreign Application Priority Data
Sep. 30, 2005    (JP) .................. 2005-285987

(51) Int. Cl.
*H04N 5/225*    (2006.01)
(52) U.S. Cl. ....................... 348/374; 396/535
(58) Field of Classification Search .................. 348/45, 348/65, 373–375; 396/535; 439/70, 71, 439/607, 607.34–607.37; 381/361
See application file for complete search history.

(56) References Cited

U.S. PATENT DOCUMENTS

| | | | |
|---|---|---|---|
| 6,811,408 B2 | 11/2004 | Achammer et al. | |
| 7,435,139 B2 * | 10/2008 | Yang | 439/607.01 |
| 7,699,619 B2 * | 4/2010 | Mizumura | 439/71 |
| 2004/0203264 A1 | 10/2004 | Liao et al. | |
| 2004/0247311 A1 * | 12/2004 | Ajiki et al. | 396/535 |
| 2005/0153600 A1 | 7/2005 | Lu | |

FOREIGN PATENT DOCUMENTS

| | | |
|---|---|---|
| EP | 1 511 298 A1 | 3/2005 |
| JP | 11-325702 | 5/2001 |
| JP | 2003-92168 | 3/2003 |
| JP | 2003-196664 | 2/2005 |
| JP | 2003-390125 | 6/2005 |
| WO | 03/101162 A2 | 12/2003 |

OTHER PUBLICATIONS

International Search Report for PCT/US2006/038415.

* cited by examiner

*Primary Examiner* — Tuan Ho
*Assistant Examiner* — Kent Wang
(74) *Attorney, Agent, or Firm* — Timothy M. Morella

(57) ABSTRACT

A module socket for use with camera modules has an insulative housing with a base and four walls extending upward. The base and walls have L-shaped terminal-receiving cavities that receive terminal therein. The terminals extend between the two legs of the L-shaped cavities so as to position a terminal contact portion in opposition to contacts on the bottom surface of a camera module. Two metal retainers are applied to two opposing walls of the housing and these retainers have locking arms that extend horizontally into the interior space of the housing. The locking arms each include separate angled guide members and engagement members, the first of which guide a module into the socket and the second of which retain the module in place within the socket.

16 Claims, 5 Drawing Sheets

MODULE SOCKET

BACKGROUND OF THE INVENTION

The present invention relates to a module socket and more particularly to an improved socket for use with camera modules of small electronic devices, such as mobile telephones.

Conventionally, module sockets (see, for example, Japanese Patent No. 3620833) have been used for mounting camera modules, each of which is composed of an optical element such as a lens, and an image pickup device such as a CCD (Charge Coupled Device) or CMOS (Complementary Metal Oxide Semiconductor) image sensor, on substrates of small-sized electronic devices such as mobile cellular phones and PDAs (Personal Digital Assistants).

FIG. 7 is a sectional view of a conventional module socket in which the housing of the module socket receives a camera module 302. Two latches 304 are attached to the inner surface of each of two opposed side walls of the socket housing 303. The latches 304 are used to hold the camera module in place and they, as shown, engage corresponding flat latch surfaces 310 that are formed on a stepped portion of the camera module 302. The latches serve to lock the camera module 302 in place in its socket.

Each latch 304 has a free end with latch piece 305 and a latch piece 306 which differ in height from each other. This is done in order to cope with dimensional variations among different types of camera modules 302 of the same type derived from manufacture-related dimensional errors. They cope with the mixed presence of a small-sized module 302a having relatively small outside dimensions and a large-sized module 302b having relatively large outside dimensions. In the case of the small-sized module 302a, the latch piece 306, shown on the right of FIG. 7, whose level is low, is engaged with the latch surface 310, whereas, in the case of the large-sized module 302b, the latch piece 305, whose level is high, is engaged with the latch surface 310.

Meanwhile, terminals 307 are attached to a bottom portion 308 of the socket housing 303 and they project upward from the bottom portion 308 by the effect of their own spring properties. The terminals 307 come into contact with opposing contacts which are formed on the bottom surface of the camera module 302. In the case of the small-sized module 302a, the projection distance of the socket terminals 307 is large, and in the case of the large-sized module 302b, the projection distance of the socket terminals 307 is small.

In this and other conventional camera module sockets, four such latches 304 are used to form a lock mechanism, thereby increasing the number of components and the cost of forming the camera module socket. Also, the use of four such latches requires that all four latches 304 must be handled simultaneously when the camera module 302 is to be detached from the module socket. Manually operating the four latches 304 at the same time is difficult and therefore operability is poor. Furthermore, because of absence of means for restricting the posture of the latches 304, excessive, inward inclination of the latch(es) 304 cannot be prevented. An improper operation of mounting the camera module 302 causes damage to or deformation of the latch(es) 304. If the latches 304 fail to lock the camera module 302 in place with a sufficiently strong force, in some cases, an external impact may cause the camera module 302 to release from the camera module socket.

In order to secure curved portions for the latches 304 so as to lock the camera module 302 with sufficiently effective spring properties, the latches must be a sufficient height. This increase in height creates difficulty in reducing the thickness of the module socket.

The present invention is therefore directed to a camera module socket that overcomes the aforementioned disadvantages.

SUMMARY OF THE INVENTION

It is a general object of the present invention to provide a module socket for use with camera modules which employs retainers, and each retainer having locking arms extending generally perpendicular to the direction of insertion of a module.

Another object of the present invention is to provide a module socket that includes the aforementioned retainers and also includes means for restricting the displacement of distal ends of the locking arms and in which the locking arms include engagement pieces at distal ends of the locking arms, which reduce the number of components and time for assembly with a resultant reduction in cost.

To achieve the above object, the present invention provides a module socket formed an electrically insulative material and including a bottom base facing a bottom of the module, and a side wall standing up from the periphery of the bottom base and surrounding at least a portion of the module along a side surface thereof. A terminal is supported by the housing and a retainer is attached to the side wall. In the module socket, the retainer includes a locking arm that is disposed inside the module socket, which includes an engagement member located at a distal end portion thereof. Insertion of the camera module into the socket causes a guide piece to move toward the exterior of the module socket, whereby the module is received in the module socket; and the engagement member retains the inserted module at a predetermined position.

Preferably, the retainer includes a pair of such locking arms and at least a pair of the retainers are provided in opposition to each other, mounted on opposing side wall of the module socket. Each such locking arm preferably includes a camera module guide member disposed thereon in alignment with an independent camera module engagement member. The guide member has a downwardly angled or curved surface to guide the module into the socket during insertion.

At least one cutout is formed on two of the housing side walls, and the locking arm of the retainer extends horizontally at an angle, into the cutout. A position restriction mechanism is disposed around the distal end portion of the locking arm so that it may restrict displacement of the locking arm.

The terminals are preferably attached to the socket housing such that an arm portion thereof projects into a recess or cavity formed in the housing in such a manner as to extend into the bottom plate portion and into the side wall portion, such that the terminal applies an upward force onto a camera module inserted into the socket to thereby hold the camera module in place between the engagement member and the terminal arm portion. A distal end of the terminal arm portion is located below an upper surface of the bottom plate portion of the housing.

The camera module socket of the present invention employs the retainer having the locking arm which extends perpendicular to the direction of insertion of the module, and a position restriction mechanism for restricting the displacement of the distal end of the locking arm. The guide member for guiding insertion of the module and the engagement member are formed at a distal end portion of the locking arm and extend from opposing edges of the locking arm. Accordingly, the number of components is reduced, as is the time required to assemble the socket, thereby reducing the cost, while maintaining a small size and reliability of the camera module socket.

DETAILED DESCRIPTION OF THE PREFERRED EMBODIMENT

Figure 1:
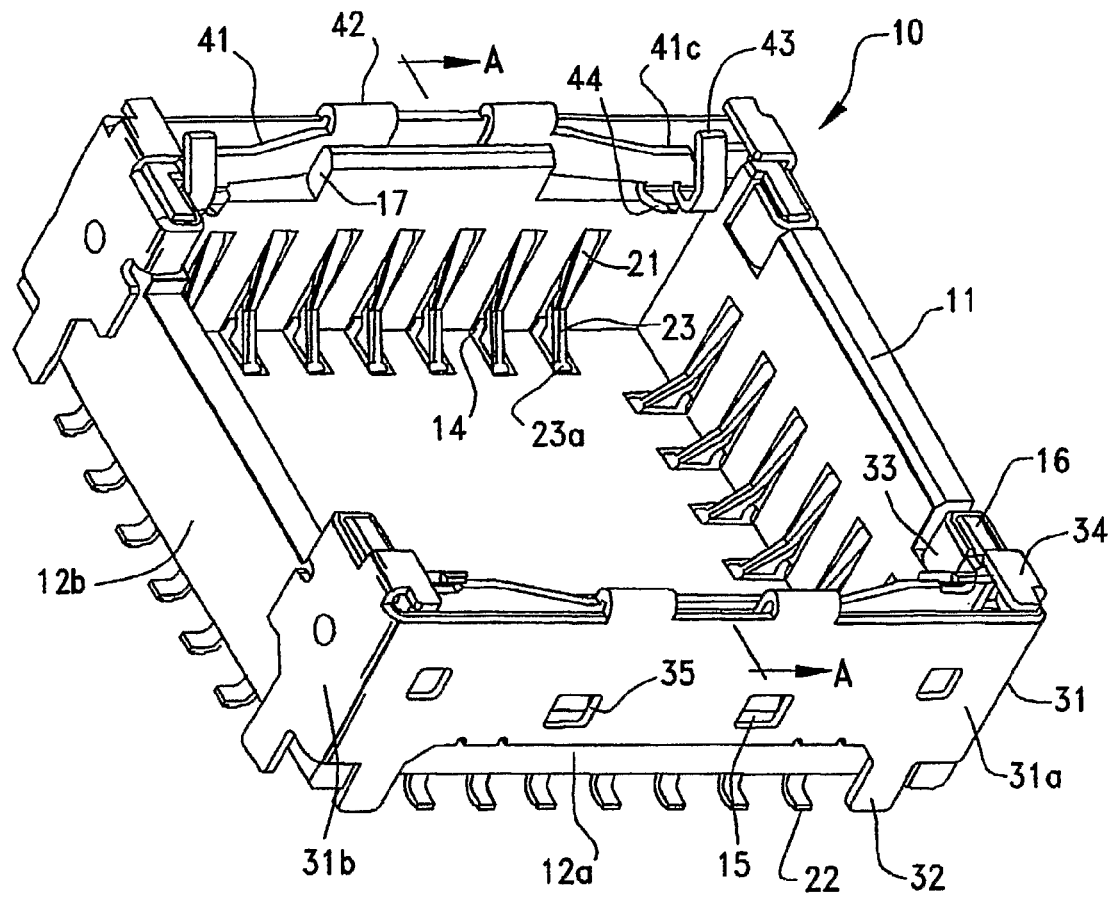
FIG. 1 is a perspective view of a socket module constructed in accordance with the principles of the present invention.
Figure 2:
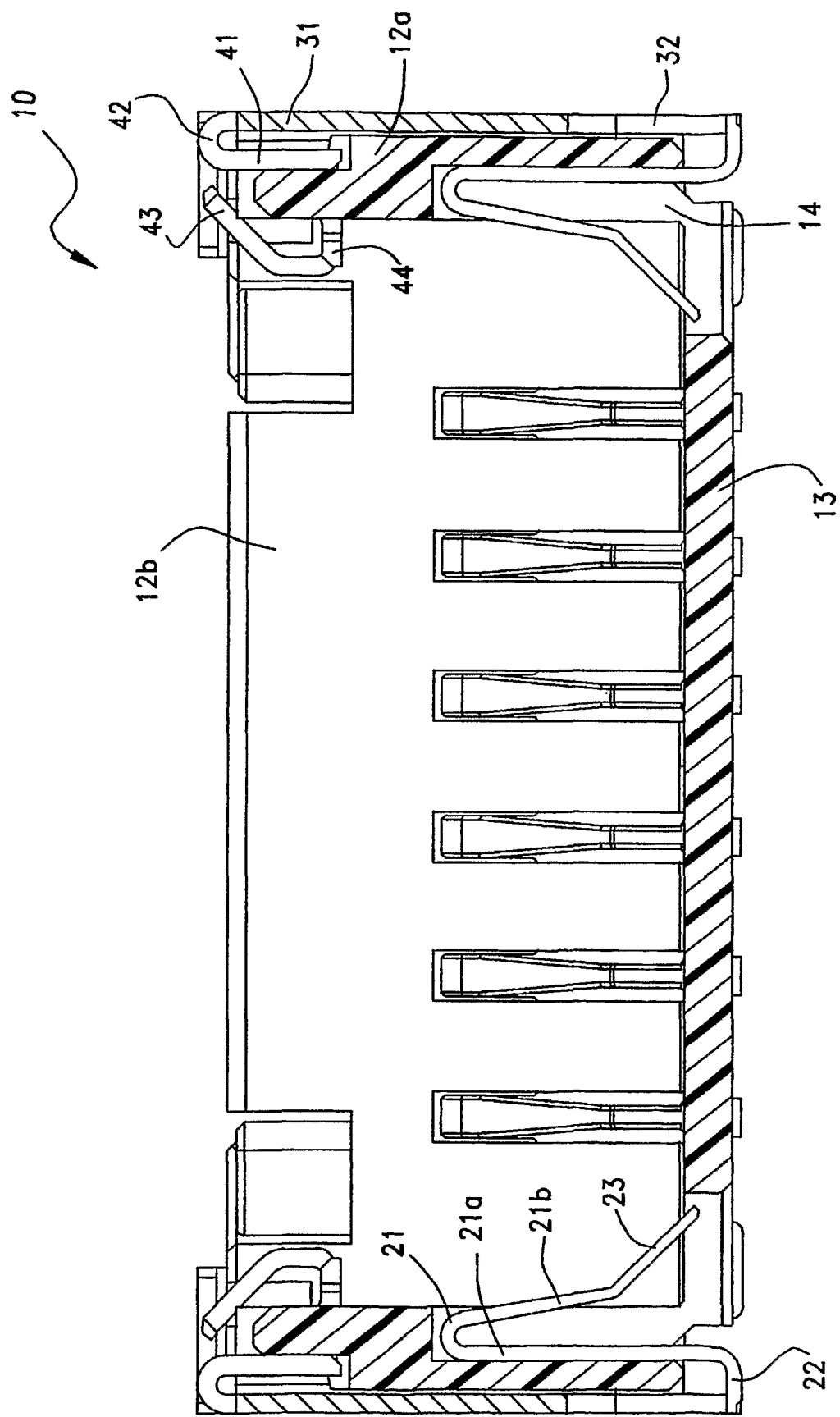
FIG. 2 is a sectional view of the socket taken along line A-A of FIG. 1.

FIG. 1 is a perspective view of a camera module socket 10 constructed in accordance with the principles of the present invention, while FIG. 2 is a sectional view of the socket 10 taken along line A-A of FIG. 1.

The socket 10 serves to hold a camera module and is used to electrically connect the camera module 51, to a substrate such as a printed circuit board. In the present embodiment, the module 51 is a camera module composed of an optical element such as a lens, and an image pickup device such as a CCD or CMOS image sensor. However, the module 51 may be of any kind. For example, the module 51 may be a sensor module which includes an infrared sensor or a fingerprint-reading sensor, or an acoustic module such as a microphone. The socket 10 is used to mount the module 51 on a small-sized electronic device, typically a cellular phone or a PDA. However, the socket 10 may be used to mount the module 51 on a device of any kind; for example, on a household electric device such as a TV, a washing machine, or a refrigerator, on a security monitor, or on an automobile. The socket 10 is mounted on a substrate such as a printed circuit board. The substrate may be either rigid or flexible or of any material or any kind.

As shown in FIG. 1, the socket 10 includes a housing member 11 for accommodating the module 51, terminals 21 attached to the housing member 11 and retainers 31 attached to the housing member 11. The socket 10 assumes the form of a closed-bottomed container having an open end. Notably, in the present embodiment, the closed-bottomed container is substantially of a rectangular parallelepiped shape with a top end of it open and a bottom end closed.

The housing member 11 is unitarily formed of an electrically insulative material such as a synthetic resin. The housing member 11 includes a rectangular bottom plate portion, or base, 13 which corresponds to one end face of the rectangular socket and faces the bottom surface of the module 51, and one to four side wall portions 12 which stand up from corresponding sides of the bottom plate 13 to define a hollow interior space of the module socket and to surround the module 51 along its side walls. The side walls 12 correspond to the side walls of the rectangular tube and are divided into a pair of first side walls 12a to which the corresponding retainers 31 are attached, and a pair of second side walls 12b which do not support any retainers 31. The two first side walls 12a face each other, as do the two second side walls 12b. The first side walls 12a and the second side walls 12b may be referred to collectively in this description as side walls 12.

A plurality of terminal-receiving cavities 14 for accommodating the corresponding terminals 21 are formed on the bottom base 13 in the vicinity of the sides thereof and in the side walls 12. As shown in FIG. 2, the terminal cavities 14 are thin elongated grooves each having an L-shaped cross section and are formed so they have two separate parts or legs, one of which extends horizontally in the bottom plate portion 13 and the other which extends vertically in the side walls 12. Each cavity 14 preferably accommodates one terminal 21. In FIG. 2, seven terminal cavities 14 are formed on each first side wall portion 12a, and six terminal cavities 14 are formed on each second side wall portion 12b. The number and arrangement of the terminal cavities 14 will depend on the number of contacts on the module to be received in the socket 10.

The terminals 21 are formed by stamping and bending them from thin sheet metal. The main body of each of the terminals 21 has a general U-shape and includes an outer base portion 21a and an inner base portion 21b. The outer base portion 21a and the inner base portion 21b are formed integral with each other via a curved portion, which is elastically deformed, thereby effecting a spring function. The outer base portion 21a is preferably wider than the inner base portion 21b and is press-fitted, from below the bottom plate portion 13, between the side walls of the terminal accommodation portion 14 of the housing member 11. A tail portion 22, which serves as a solder tail, is formed integrally with a distal end of the outer base portion 21a. The tail portion 22 is bent at substantially right angles to the outer base portion 21a.

An arm portion 23 is formed integrally with a distal end of the terminal inner base portion 21b and serves as a contact portion of the terminal for electrically connecting contacts located on the bottom of the module 51. The terminal arm portion 23 is integral with the inner base portion 21b by way of a bent portion, and extends obliquely downward from the bent portion and then projects inward from the bent portion and above a side of the bottom plate portion 13. A laterally expanding expanded portion 23a is formed at the free (distal) end (shown as the lower end in FIG. 2) of the arm portion 23. The width of the expanded portion 23a approximates the width of the terminal cavity 14, thereby improving positioning accuracy in the lateral direction of the arm portion 23 (in a direction in which a side of the bottom plate portion 13 extends) and improving reliability of electrical connection to a contact of the module 51.

As shown in FIG. 2, the free end of the arm portion 23 is located between the upper and lower surfaces of the bottom plate portion 13, within the range of thickness of the bottom base 13 in the terminal cavity 14 and does not project outward of the housing member 11. The terminal may be considered as extending from one part of the L-shaped cavity 14 to the other part of the cavity. Accordingly, during transport of the socket 10 for mounting the socket 10 on a substrate or the like, the free ends of the arm portions 23 do not come into contact with or are not caught by another member or the like. Thus, deformation of the terminals 21 caused by careless handling can be prevented.

When the terminals 21 are fitted into their corresponding cavities 14 of the housing 11, each of the outer base portions 21a is fixedly held from both sides by the opposite side walls of the terminal cavity 14. The projections of the terminal outer base portion 21a bite into the corresponding sides of the cavities 14, the outer base portion 21a is reliably fixed in the housing. As shown in FIG. 2, the lower surface of the tail portion 22 projects slightly downward from the lower surface of the bottom plate portion 13 of the housing member 11, and a portion of the arm portion 23 other than the free end projects inward from the inner base portion 21b and above the bottom base 13. The tail portions 22 are connected, by soldering or the like, to corresponding conductive traces or lands connected to the conductive traces formed on an unillustrated substrate.

In the present embodiment, the retainers 31 for locking the module 51 are attached to the corresponding first side walls 12a of the housing 11. Each of the retainers 31 has a substantially rectangular shape which is slightly wider than the first side wall portion 12a, and is formed from sheet metal. The retainer 31 is a member having a shape resembling a square "C"-shape such that opposite end portions 31b of a main body portion 31a are bent perpendicular to the main body portion 31a. The main body portion 31a has a length substantially equal to that of the first side wall 12a. The retainer 31 is attached to the first side wall portion 12a such that the main body portion 31a covers the outer surface of the first side wall portion 12a along the entire length and such that the end portions 31b cover, from the outside, end portions of the corresponding second side wall portions 12b, the end portions being integral with the corresponding opposite ends of the first side wall portion 12a. Engagement holes 35 are formed in the main body portion 31a of the retainer and are engaged with engagement projections 15 that are formed on the outer surface of the first side wall 12a. A fixing finger 33 projects from an upper portion of a distal end of each of the end portions 31b and is bent into a C-shape so as to engage a post 16 that is formed at an upper edge of each of the second side walls 12b.

A plurality of lower projections 32 may be formed at a lower edge of each of the retainers 31 and project downward and serve as mounting posts or standoffs for the module socket. When the retainer 31 is attached to the corresponding first side wall portion 12a, as shown in FIG. 2, the lower end surfaces of the lower projections 32 project down from the lower surface of the housing bottom base 13 as do the tail portions 22 of the terminals 21. The bottom surface of the lower projections 32 and the terminal tails are at the same level so they may be reliably connected, by soldering or the like, to corresponding connection pads on the surface of a substrate. The lower projections may be connected to a ground trace on the substrate to ground the retainers 31, so they may function as electromagnetic shields. The number and arrangement of the lower projections 32 can be modified as appropriate so as not to interfere with signal traces formed on the surface of the substrate.

A pair of laterally projecting locking arms 41 are formed at an upper edge of the main body portion 31a of each of the retainers 31. The locking arms 41 are formed to be horizontally cantilevered members that lengthwise along the retainers. Two connection pieces 42 are formed integrally with the upper edge of the main body portion 31a of the retainer 31 in a longitudinally central region and are bent over and downwardly. The locking arms 41 integrally extend from the corresponding connection pieces 42 in a lateral direction toward the corresponding end portions 31b; i.e., in a longitudinal direction of the main body portion 31a of the retainer 31. Distal end portions 41c of the locking arms 41 are movable substantially in parallel with the surface of the bottom plate portion 13. Furthermore, the distal end portions 41c of the locking arms 41 are disposed at the corresponding four corners of the housing member 11.

A guide member 43, which serves to guide the module 51 to be inserted, and an engagement member for engaging the module 51, are formed integrally with each of the distal end portions 41c. Cutouts 17 are formed at corresponding opposite end portions of the upper edge of each of the first side walls 12a. The distal end portions 41c of the locking arms 41 are advanced into the corresponding cutouts 17. The guide members 43 and the engagement members 44 partially project, through the cutouts 17, into the interior space of the socket 10 beyond the inner surfaces of the first side wall 12a. Thus, the module 51 can be locked at the four corners of the socket 10 having a shape resembling a rectangular parallelepiped, so that the module 51 can be reliably locked in a stable condition.

Figure 4:
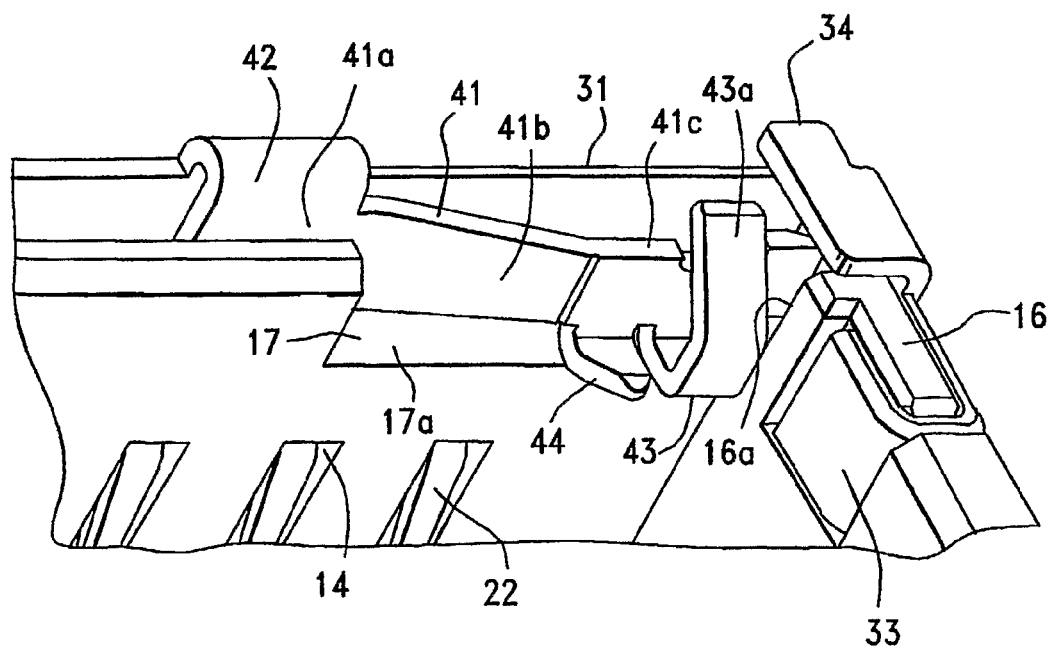
FIG. 4 is an enlarged view of an upper right corner region of the socket of FIG. 1, showing essential portions of retainer locking arm according to the embodiment of the present invention.
Figure 3:
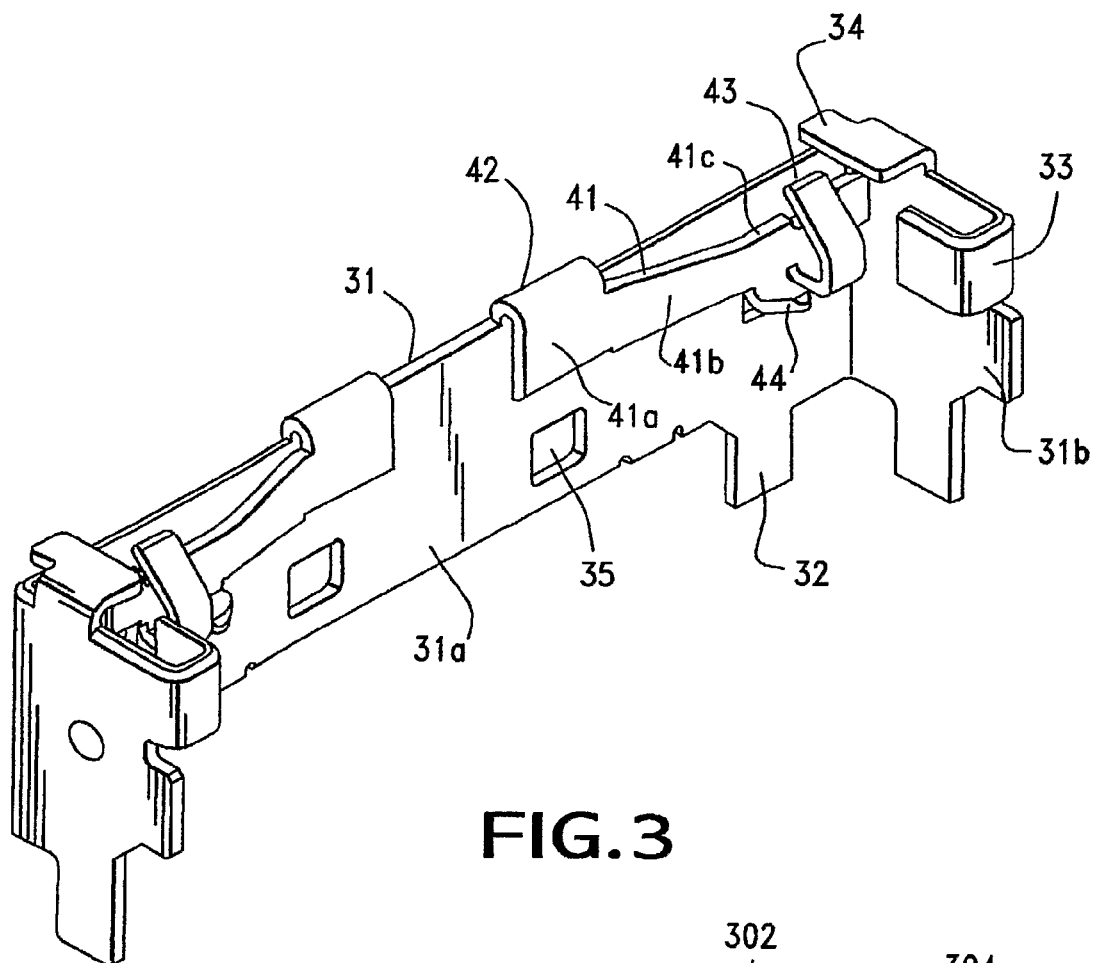
FIG. 3 is a perspective view of a socket retainer member constructed in accordance with the principles of the present invention.
Figure 7:
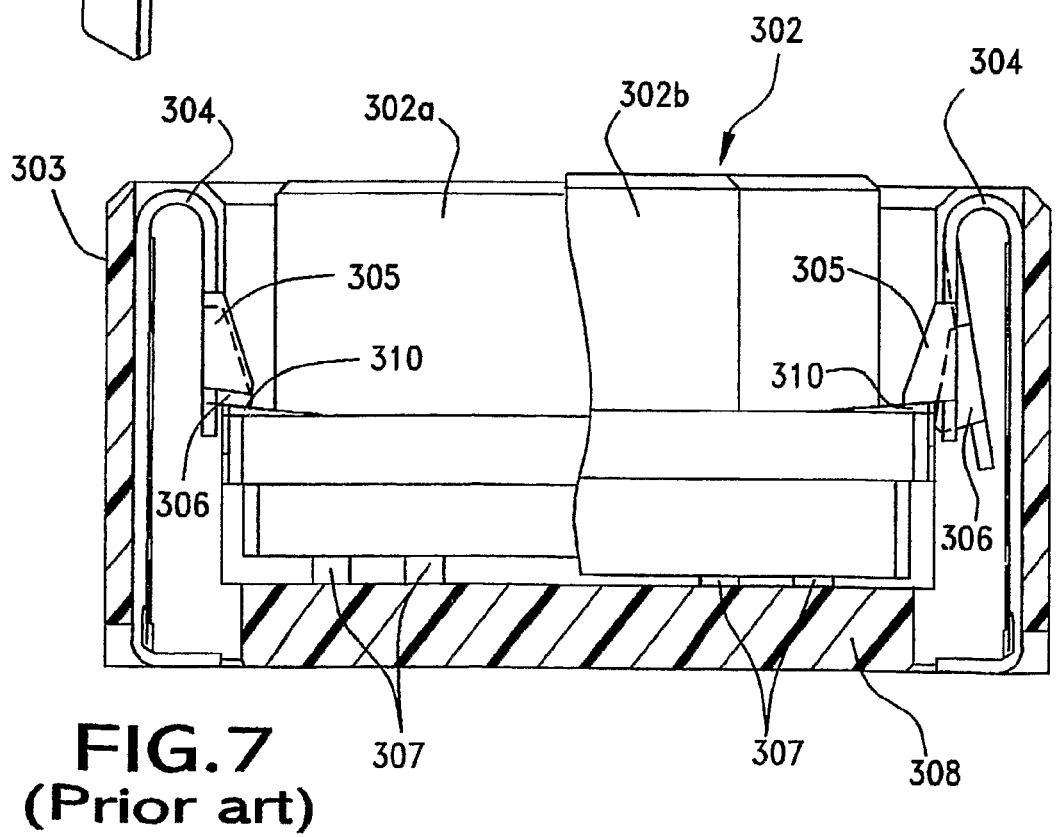

FIG. 3 is a perspective view of the retainer used in the present invention, while FIG. 4 is an enlarged view of an upper right corner region of the socket of FIG. 1, showing essential portions of the locking arms. As shown in FIG. 3, each of the locking arms 41 includes a root portion 41a formed integrally with the connection piece 42; a main body portion 41b having the shape of a cantilever and extending laterally from the root portion 41a toward the end portion 31b; and, the distal end portion 41c formed integrally with the free end of the main body portion 41b and having the guide piece 43 and the engagement piece 44. The locking arms 41 are formed by forming blanks from a plate material having spring properties such as a metal plate and subjecting the blanks to bending and the like. The main body portion 41b is formed by bending so as to form a predetermined angle with respect to the root portion 41a in parallel with the main body portion 31a of the retainer 31. The distal end portion 41c is formed by bending so as to be substantially in parallel with the root portion 41a and to form a predetermined angle with respect to the main body portion 41b. Accordingly, the distal end portion 41c is further apart from the main body portion 31a of the retainer 31 than is the root portion 41a. Thus, as shown in FIG. 4, in a condition where the retainer 31 is attached to the corresponding first side wall portion 12a, the root portion 41a is in contact with the outer surface of the first side wall portion 12a, whereas the distal end portion 41c is advanced into the cutout 17.

The guide member 43 is formed integrally with a lower edge of the distal end portion 41c such that its root portion is substantially perpendicular to the distal end portion 41c; extends from the distal end portion 41c toward the interior of the socket 10; is bent upward at substantially a right angle from the root portion; and, it is bent from the upright portion in such a manner as to be inclined toward the exterior of the socket 10. Thus, the guide member 43 assumes a shape resembling a trapezoid as viewed from the side. A free distal end of the guide member 43 is located slightly outward of the distal end portion 41c of the lock arm 41 toward the exterior of the socket 10. The surface of a distal end portion of the guide member 43 is inclined downward toward the interior of the socket 10 to thereby be formed into a curved, angled or tapered surface 43a. During insertion of the module 51 into the socket 10, a boundary edge portion between the bottom surface and a side surface of the module 51; i.e., a lower side edge of the module 51, slides on the angled surface 43a, thereby allowing smooth insertion of the module 51. In this case, the lower side edge of the module 51 applies a force directed toward the exterior of the socket 10 to the guide piece 43, so that the distal end portion 41c of the locking arm 41 is elastically displaced toward the exterior of the socket 10. As the insertion of the module 51 advances further, a side wall of the module 51 moves downward while sliding on the vertical surface of the guide member 43 extending downward from the angled surface 43a. When an engagement stepped-portion formed on the side wall of the module 51 passes the guide member 43 and moves downward, the guide member 43 is released from subjection to the force directed toward the exterior of the socket 10, so that the distal end portion 41c of the locking arm 41 is displaced toward the interior of the socket 10 by the effect of its own spring properties. Thus, the lower surfaces of the guide members 43 are engaged with the upper surface of the engagement stepped-portion of the module 51, whereby the module 51 is locked by the locking arms 41.

The engagement member 44 is formed integrally with a lower edge of the distal end portion 41c of the lock arming 41 such that its root portion is substantially perpendicular to the distal end portion 41c, and extends toward the interior of the socket 10. The engagement member 44 is formed such that its distal end does not project toward the interior of the socket 10 beyond the vertical surface of the guide member 43. Accordingly, during insertion of the module 51 into the socket 10, a side surface of the module 51 does not rub against the distal end of the engagement piece 44. The lower surface of the engagement piece 44 is located at substantially the same level as that of the lower surface of the guide piece 43 and is engaged with the upper surface of the engagement stepped-portion of the module 51. In other words, the engagement pieces 44, together with the guide members 43, function as a lock mechanism for locking the module 51.

An upper-position restriction piece 34 is formed integrally with an upper edge of each end portion 31b of the retainer 31 such that its root end is substantially perpendicular to the end portion 31b, and extends toward the interior of the socket 10. The free end of the locking arm 41; i.e., the end of the distal end portion 41c of the lock arm 41, is located under the upper-position restriction piece 34. Accordingly, the upper-position restriction piece 34 restricts upward displacement of the distal end of the locking arm 41. In other words, when the distal end of the lock arm 41 abuts the upper-position restriction piece 34 as a result of subjection of the locking arm 41 to an external force, the distal end of the locking arm 41 is not displaced further upward beyond the upper-position restriction piece 34.

In a condition where the retainer 31 is attached to the corresponding first side wall portion 12a, an end of the distal end portion 41c of the locking arm 41 is advanced into the cutout 17 and is located above a lower-position restriction surface 17a, which is a bottom surface of the cutout 17. Accordingly, the lower-position restriction surface 17a restricts downward displacement of the distal end of the locking arm 41. In other words, when the distal end of the locking arm 41 abuts the lower-position restriction surface 17a as a result of subjection of the locking arm 41 to an external force, the distal end of the locking arm 41 is not displaced further downward beyond the lower-position restriction surface 17a.

In a condition where the retainer 31 is attached to the corresponding first side wall portion 12a, the end of the distal end portion 41c of the locking arm 41 is advanced into the cutout 17 and faces an inward-position restriction surface 16a, which is a side surface of the fixation piece 16 formed on an upper edge of the corresponding second side wall portion 12b. Accordingly, the inward-position restriction surface 16a restricts a displacement of the distal end of the locking arm 41 toward the interior of the socket 10. In other words, when the distal end of the locking arm 41 abuts the inward-position restriction surface 16a as a result of subjection of the locking arm 41 to an external force, the distal end of the locking arm 41 is not displaced further inward beyond the inward-position restriction surface 17a.

Furthermore, the main body portion 31a of the retainer 31 is located outward of the distal end portion 41c of the locking arm 41 toward the exterior of the socket 10. Accordingly, the inner surface of the main body portion 31a restricts a displacement of the distal end of the locking arm 41 toward the exterior of the socket 10. In other words, when the distal end of the locking arm 41 abuts the inner surface of the main body portion 31a as a result of subjection of the locking arm 41 to an external force, the distal end of the locking arm 41 is not displaced further outward beyond the inner surface of the main body portion 31a.

As described above, the upper-position restriction piece 34, the lower-position restriction surface 17a, the inward-position restriction surface 16a, and the inner surface of the main body portion 31a collectively function as a position restriction mechanism, thereby restricting upward, downward, inward, and outward displacements of the distal end of the locking arm 41. Accordingly, even when the locking arms 41 are subjected to an external force, the locking arms 41 are not excessively deformed.

Figure 5:
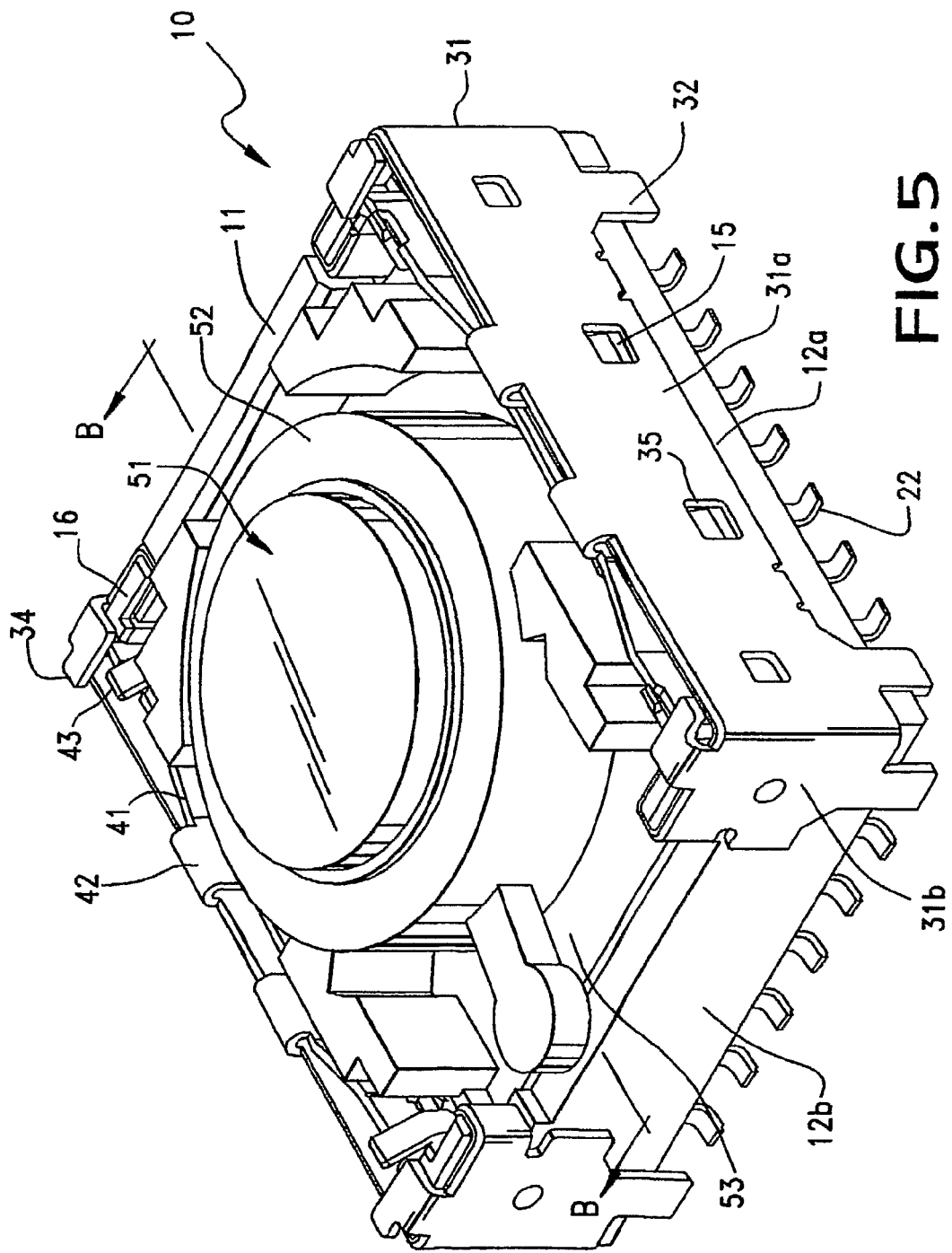
FIG. 5 is a perspective view of the socket of FIG. 1 as viewed after a module is mounted therein.
Figure 6:
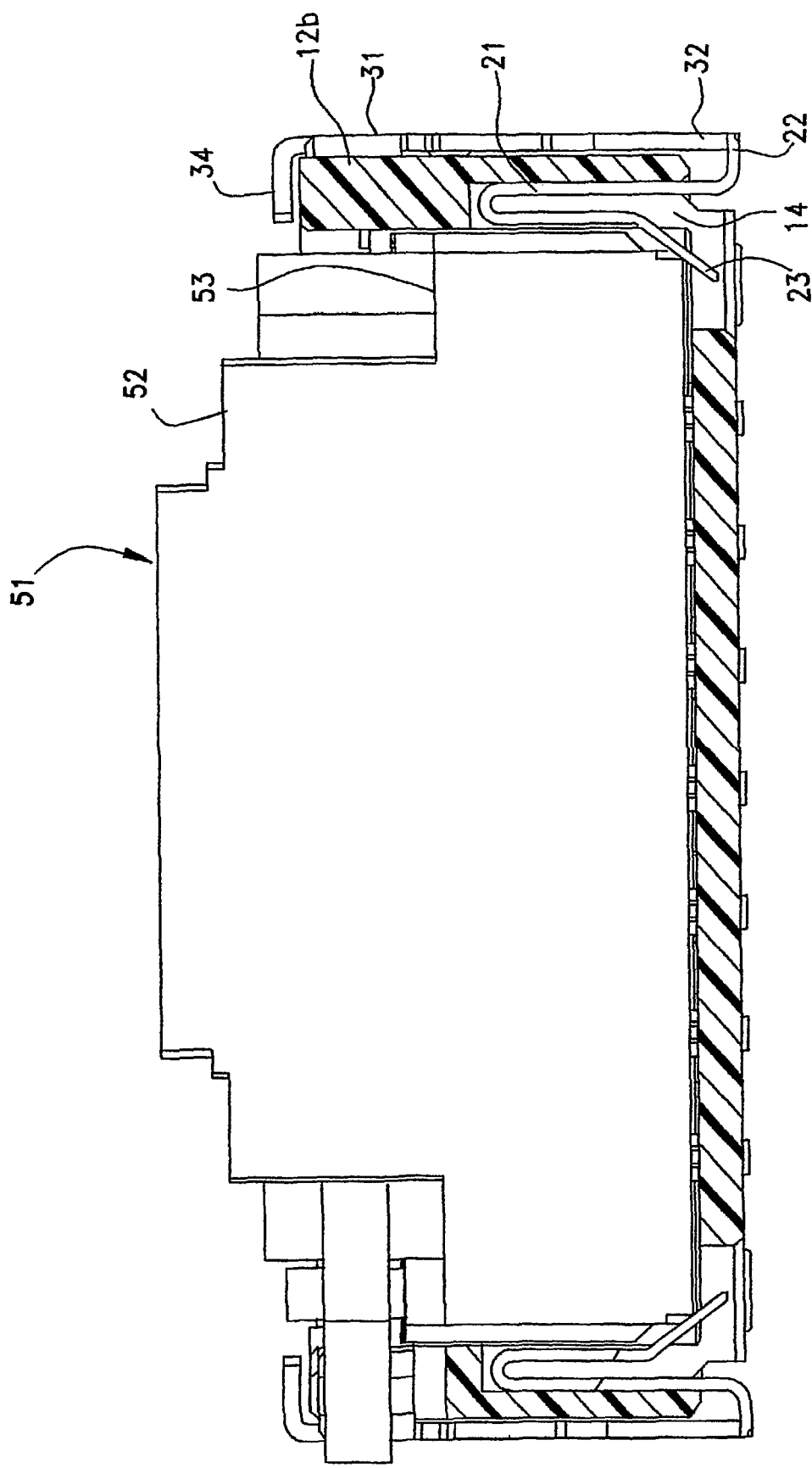
FIG. 6 is a sectional view of the socket loaded with the module taken along line B-B of FIG. 5; and, FIG. 7 is a sectional view of a conventional module socket.

Next, the mounting the module 51 in the socket 10 will be described. FIG. 5 is a perspective view of the socket according to the present embodiment as viewed after a module is mounted therein. FIG. 6 is a sectional view of the socket loaded with the module taken along line B-B of FIG. 5.

Herein, it is assumed that the socket 10 is mounted beforehand on an unillustrated substrate. The substrate has signal traces. The signal traces are exposed at the upper surface of the substrate at least in a region where the socket 10 is mounted, thereby forming connection portions. Alternatively, signal traces are connected to corresponding connection portions such as connection pads exposed at the upper surface of the substrate. Thus, the terminals 21 of the socket 10 can be connected to the connection portions by soldering or like connection means. The lower surfaces of the tail portions 22 of the terminals 21 are connected to the corresponding connection portions by soldering or like connection means. Also, connection portions such as connection pads to which the retainers 31 are connected are disposed on the surface of the substrate. The lower projections 32 of the retainers 31 can be connected to the connection portions by soldering or like connection means. At least some of the connection portions to which the retainers 31 are connected may be connected to a ground trace of the substrate.

When the socket 10 is to be mounted on a substrate by using soldering as connection means, a solder paste is applied to the upper surfaces of connection portions exposed at the upper surface of the substrate. Then, the solder paste is reflowed for soldiering. In this case, the socket 10 is placed on the substrate such that the tail portions 22 of the terminals 21 and the lower projections 32 of the retainers 31 are located on the corresponding connection portions covered with the solder paste. While the socket 10 is placed on the substrate, soldering is performed such that the solder paste is reflowed by application of heat effected by a heating furnace or like heating means.

The module 51 is inserted into the housing member 11 from above, whereby the module 51 is mounted in the socket 10 as shown in FIGS. 5 and 6. The module 51 includes an upper portion 52 having a substantially columnar shape and a lower portion 53 having a shape resembling a rectangular parallelepiped. Contacts are exposed at predetermined positions on side edges of the bottom of the lower portion 53; i.e., on boundary edges between the bottom surface and the side surfaces of the lower portion 53; i.e., on lower side edges of the lower portion 53. The contacts are connected to the arm portions 23 of the predetermined corresponding terminals 21.

During insertion of the module 51 into the housing member 11, side surfaces of the lower portion 53 slide on the guide members 43 of the locking arms 41. The upper surface of the lower portion 53 functions as an engagement stepped-portion of the module 51 with which the guide members 43 and engagement members 44 engage. When the module 51 is inserted into the housing member 11, the side edges of the bottom of the lower portion 53 first abut the taper surfaces 43a of the guide members 43 of the locking arms 41, for the guide members 43 project toward the interior of the socket 10 beyond the inner surfaces of the first side wall portions 12a. Subsequently, as the module 51 is further inserted, the side edges of the bottom of the lower portion 53 slide on the taper surfaces 43a and move downward. The side edges of the bottom of the lower portion 53 apply a force directed toward the exterior of the socket 10 to the guide pieces 43, so that the distal end portions 41c of the locking arms 41 are elastically displaced toward the exterior of the socket 10.

Subsequently, as the module 51 is further inserted, side walls of the lower portion 53 of the module 51 move downward while sliding on the vertical surfaces of the guide pieces 43 extending downward from the taper surfaces 43a. When side edges of the upper surface of the lower portion 53 pass the guide members 43 and move downward, they are released from subjection to the force directed toward the exterior of the socket 10, so that the distal end portions 41c of the locking arms 41 are displaced toward the interior of the socket 10 by the effect of their own spring properties. Thus, the lower surfaces of the guide pieces 43 are engaged with the upper surface of the lower portion 53; i.e., with the upper surface of the engagement stepped-portion of the module 51. Similarly, the lower surfaces of the engagement members 44 are engaged with the upper surface of the engagement stepped-portion of the module 51. Thus is completed insertion of the module 51 into the housing member 11. As shown in FIGS. 5 and 6, the module 51 is locked by the locking arms 41 and is mounted in the socket 10.

In a condition where the module 51 is locked by the locking arms 41 and is mounted in the socket 10, while abutting contacts disposed on the side edges of the bottom surface of the lower portion 53, the arm portions 23 of the terminals 21 are pressed and displaced. In this case, the curved portions of the terminals 21 are mainly deformed elastically, whereby the arm portions 23 are elastically displaced outward and downward. Meanwhile, since the terminals 21 function as springs, the module 51 receives a reaction force from the elastically displaced arm portions 23. In this case, since the arm portions 23 are slanted, the side edges of the bottom of the lower portion 53 which abut the arm portions 23 receive a force directed inward and upward.

Since the module 51 is subjected to a force directed inward from four directions by virtue of the spring function of the terminals 21 disposed at the four side wall portions 12, the module 51 is elastically held from four directions and is thus free from lateral play. The module 51 is subjected to an upward pressing force induced by the spring function of the terminals 21. However, since the guide members 43 and the engagement pieces 44 of the locking arms 41 are engaged with the upper surface of the engagement stepped-portion of the module 51, upward movement of the module 51 is restricted. Accordingly, the module 51 is elastically held in the vertical direction between the terminals 21 and the locking arms 41 and is thus free from vertical play. In this manner, the module 51 is held from vertical directions and from four lateral directions, so that the module 51 is mounted and retained in the socket 10 with sufficient retaining force.

As described above, according to the present embodiment, the socket 10 has the two retainers 31 attached to the corresponding two first side wall portions 12a which face each other and are two of the four side wall portions 12 of the housing member 11. Each of the retainers 31 includes a pair of locking arms 41 whose distal end portions 41c are movable substantially in parallel with the surface of the bottom plate portion 13 of the housing member 11. The distal end portions 41c each having the guide member 43 and the engagement member 44 to be engaged with the module 51 are disposed at the corresponding four corners of the housing 11.

Since the socket 10 is configured such that a pair of the retainers 31 is attached to a single housing member 11, the socket 10 is reduced in the number of components, man-hours, and manufacturing cost. The locking arms 41 exhibit good operability; can firmly lock the module 51; and can reliably prevent detachment of the module 51. Since the distal end portions 41c of the locking arms 41 each having the guide member 43 and the engagement member 44 are movable substantially in parallel with the surface of the bottom base 13 of the housing 11, the height of the socket 10 can be reduced, thereby allowing a reduction in the size of the socket 10.

The upper-position restriction pieces 34, the lower-position restriction surfaces 17a, the inward-position restriction surfaces 16a, and the inner surfaces of the main body portions 31a are located above, below, inward of, and outward of the distal end portions 41c of the locking arms 41 and collectively function as position restriction mechanisms, thereby restricting upward, downward, inward, and outward displacements of the locking arms 41 to respectively appropriate quantities.

Accordingly, even when the locking arms 41 are subjected to an external force, the locking arms 41 are not excessively deformed and are thus free from damage or plastic deformation. Thus, the functionality and reliability of the locking arms 41 are enhanced. Even when the module 51 is subjected to a great impact as in the case where a small-sized electronic device in which the module 51 is mounted falls, for example, to a floor, the module 51 is not detached from the socket 10, since the displacements of the locking arms 41 are restricted. Accordingly, the drop impact resistance of the small-sized electronic device is enhanced.

Furthermore, since the guide members 43 have the respective angled or tapered surfaces 43a inclined downward and inward, the locking arms 41 are operated merely by moving the module 51 downward, the operability of insertion of the module 51 is enhanced.

The distal ends of the terminal arms 23 are located within corresponding cavities 14 formed in the bottom base 13, thereby preventing deformation of the terminals 21 which could otherwise result from, for example, a cable being caught by the distal ends.

The present invention is not limited to the above-described embodiment. Numerous modifications and variations of the present invention are possible in light of the spirit of the present invention, and they are not excluded from the scope of the present invention.

I claim:

1. A module socket for receiving a module inserted thereinto from above, the module socket comprising:
   a housing formed of an insulative material, the housing comprising a base that opposes a bottom portion of the module, and at least one side wall extending up from the base to cooperatively define an interior space of said module socket, the side wall extending along the module when inserted into said module socket;

at least one conductive terminal supported by said housing so that a portion of the terminal extends into the interior space of said module socket; and a retainer supported on one of said at least one side wall, the retainer including a horizontally cantilevered locking arm that partially extends into said module socket interior space, said retainer including an engagement member located at a distal end portion thereof, the locking arm further including a guide member spaced apart from the engagement member, the guide member including an angled surface that causes a displacement of said guide member in a direction away from said module socket interior space when the module is inserted into said module socket, but said engagement member engages the inserted module.

2. The module socket according to claim 1, wherein said retainer includes a pair of locking arms.

3. The module socket according to claim 2, wherein said pair of locking arms are spaced apart from each other along said retainer.

4. The module socket according to claim 1, wherein said locking arm guide member is spaced horizontally away from said engagement end.

5. The module socket according to claim 4, wherein said guide member extends out from said locking arm along a top edge thereof and said engagement member extends out from said locking arm along a bottom edge thereof.

6. The module socket according to claim 1, wherein said housing side wall includes at least one cut out portion aligned with said locking arm, the cutout defining a space into which said locking arm may deflect when a module is inserted into said socket housing.

7. The module socket according to claim 6, further including a position restriction mechanism disposed around the distal end portion of the locking arm that restricts displacement of the locking arm.

8. The module socket according to claim 1, wherein said housing includes an L-shaped terminal-receiving cavity with and said terminal includes a terminal arm portion that extends from one part of the cavity L-shape into another part of the cavity L-shape so that said terminal applies an upward force a module inserted into said module socket.

9. The module socket according to claim 8, wherein a distal end of the terminal arm portion extends below an upper surface of the bottom plate portion of said housing.

10. A camera module socket, comprising: an insulative housing having a base plate and a plurality of upstanding walls surrounding the base plate and cooperatively defining, with said base plate, a hollow enclosure for receiving a camera module, the housing including a plurality of conductive terminals, each of the terminals being received within a terminal-receiving cavity disposed in said housing, the terminal receiving cavities having a general L-shape defined by two interconnected leg portions, one of the leg portion being disposed in a side wall and the other of said two leg portions being disposed in said base plate, said terminals each including a tail portion extending out of said housing for attachment to a circuit trace on a substrate and a contact portion for contacting a conductive element of said camera module extending from the one leg portion toward and into said other leg portion, said terminal contact portions including free ends that are deflectable under pressure of a camera module inserted into said socket, said terminals exerting an upward force on a camera module inserted into said socket; and, an exterior retainer assembly including two retainer elements disposed on two opposing side walls of said housing, each of said retainer elements including a cantilevered locking arm that extends partially into the hollow enclosure, the locking arms including engagement members extending transversely out from said arms and said locking arms further including guide members extending sideways out from said locking arms, the guide members having surfaces that are angled into said hollow enclosure, and said guide members and engagement members being spaced part from each other along said locking arms.

11. The camera module socket of claim 10, wherein said locking arms are horizontally cantilevered with respect to said locking arms.

12. The camera module socket of claim 10, wherein each of said retainer elements includes a pair of locking arms disposed at opposite ends of said retainer elements.

13. The camera module socket of claim 10, wherein said guide members and said engagement members extend out from opposite edges of said locking arms.

14. The camera module socket of claim 13, wherein said guide members extend out from top edges of said locking arms and said engagement members extend out from bottom edges of said locking arms.

15. The camera module socket of claim 10, wherein said retainer elements are generally U-shaped and slip over said housing side walls.

16. The camera module socket of claim 15, wherein said side walls include engagement posts and said retainer elements include clip members that fit over said engagement posts.

* * * * *